United States Patent
Alspector et al.

(10) Patent No.: US 7,089,241 B1
(45) Date of Patent: Aug. 8, 2006

(54) CLASSIFIER TUNING BASED ON DATA SIMILARITIES

(75) Inventors: Joshua Alspector, Chantilly, VA (US); Aleksander Kolcz, Fairfax, VA (US); Abdur Chowdhury, Oakton, VA (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 10/740,821

(22) Filed: Dec. 22, 2003

Related U.S. Application Data

(60) Provisional application No. 60/442,124, filed on Jan. 24, 2003.

(51) Int. Cl.
*G06F 7/00* (2006.01)

(52) U.S. Cl. .................. 707/7; 707/10; 707/104.1; 709/205; 709/206; 709/207

(58) Field of Classification Search .............. 707/7, 707/10, 104.1; 709/205, 206, 207
See application file for complete search history.

(56) References Cited

U.S. PATENT DOCUMENTS

| | | | |
|---|---|---|---|
| 6,161,130 A | 12/2000 | Horvitz et al. | |
| 6,199,103 B1 | 3/2001 | Sakaguchi et al. | |
| 6,330,590 B1 | 12/2001 | Cotten | |
| 6,421,709 B1 | 7/2002 | McCormick et al. | |
| 6,507,866 B1 | 1/2003 | Barchi | |
| 2002/0116463 A1 | 8/2002 | Hart | |
| 2002/0116641 A1 | 8/2002 | Mastrianni | |
| 2002/0147754 A1* | 10/2002 | Dempsey et al. | 708/671 |
| 2002/0181703 A1 | 12/2002 | Logan et al. | |
| 2002/0199095 A1 | 12/2002 | Bandini et al. | |

OTHER PUBLICATIONS

H. Zaragoza et al., "Machine Learning and Textual Information Access", 4th European Conference on Principles and Practice of Knowledge Discovery in Databases (PKDD-2000), Lyon, France, Sep. 2000, pp. 1-12.

S. Hird, Technical Solutions for controlling Spam, In the proceedings of AUG2000, Melbourne, Sep. 4-6, 2002.

M. Marvin, Announce: Implementation of E-mail Spam Proposal, news.admin.net-abuse.misc., Aug. 3, 1996.

(Continued)

*Primary Examiner*—Jeffrey A. Gaffin
*Assistant Examiner*—Hung Pham
(74) *Attorney, Agent, or Firm*—Fish & Richardson P.C.

(57) ABSTRACT

A probabilistic classifier is used to classify data items in a data stream. The probabilistic classifier is trained, and an initial classification threshold is set, using unique training and evaluation data sets (i.e., data sets that do not contain duplicate data items). Unique data sets are used for training and in setting the initial classification threshold so as to prevent the classifier from being improperly biased as a result of similarity rates in the training and evaluation data sets that do not reflect similarity rates encountered during operation. During operation, information regarding the actual similarity rates of data items in the data stream is obtained and used to adjust the classification threshold such that misclassification costs are minimized given the actual similarity rates.

27 Claims, 8 Drawing Sheets

OTHER PUBLICATIONS

H. Drucker et al., "Support Vector Machines for Spam Categorization," IEEE Transactions on Neural Networks, vol. 10, No. 5, Sep. 1999.

M. Hearst et al., Support Vector Machines, IEE Intelligent Systems, Jul./Aug. 1998.

A Kolcz et al., "SVM-based Filtering of E-mail Spam with Content-specific Misclassification Costs," TextDM' 2001 (IEEE ICDM-2001 Workshop on Text Mining), San Jose, CA 2001.

R. Hall, "A Countermeasure to Duplicate-detecting Anti-spam Techniques", AT&T Technical Report 99.9.1, 1999.

T. Joachims, "Text Categorization with Support Vector Machines: Learning with Many Relevant Features", University of Dortmund, Computer Science Dept., LS-8 Report 23, 1998.

Bart Massey et al., Learning Spam: Simple Techniques for Freely-Available Software, Computer Science Dept., Portland, OR USA, 2003, pp. 1-14.

J. Dudley, "Telstra targets Net spammers", news.com.au, Dec. 2, 2003.

http://www.paulgraham.com/better.html, Better Bayesian Filtering, Jan. 2003, pp. 1-11.

http://www.palimine.net/qmail/tarpit.html, "Tarpitting with qmail-smtpd", p. 1.

Dale Woolridge et al., "qmail-spamthrottle (5)—the spam throttle mechanism", http://spamthrottle.qmail.ca/man/qmail-spamthrottle.5.html, pp. 1-4.

P. Bennett, *Assessing the calibration of native bayes' posterior estimates*, report, Dept. of Computer Science, School of Science, Carnegie Mellon University 2000.

L. Breiman, *Out-of-bag estimation*, tech. report, Department of Statistics, University of California Berkeley, 1996.

M. Brown, W. N. Grundy, D. Lin, N. Cristianini, C. Sugnet, M. Ares and D. Haussler, *Support vector machine classification of microarray gene expression data*, Tech. Report UCSC-CRL-99-09, University of California, Santa Cruz, 1999.

P. Domingos, *MetaCost: A General method for making classifers cost-sensitive*, in Proceedings of the Fifth International Conference of Knowledge Discovery and Data Mining, ACM Press, 1999, pp. 155-164.

S. Dumais, J. Platt, D. Heckerman, and M. Sahami, *Inductive learning algorithms and representations for text categorization*, in Proceedings of $7^{th}$ International Conference on Information and Knowledge management, 1998, pp. 229-237.

T. Joachims, *Text categorization with support vector machines: Learning with many relevant features*, in Proceedings of the Tenth European Conference on Machine Learning (ECML-98), 1998, pp. 137-142.

C. Lin, *Formulations of support vector machines: A Note from an optimization point of view*, Neural Computation, 13 (2001), pp. 307-317.

D. Margineantu and T. Dietterich, *Bootstrap methods for the cost-sensitive evaluation of classifiers*, in Proceedings of the 2000 International Conference on Machine Learning, ICML-2000, 2000.

K. Morik, M. Imhoff, P. Brockhausen, T. Joachims, and U. Gather, *Knowledge and discovery and knowledge validation in intensive care*, Artifical Intelligence in Medicine, 19 (2000), pp. 225-249.

J. Platt, *Fast training of support vector machines using sequential minimal optimization*, in Advances in Kernel Methods - Support Vector Learning, B. Schölkopf, C. Burges, and A. Smola, eds., MIT Press, 1999.

V. N. Vapnik, *Statistical Learning Theory*, Chapter 10, John Wiley, New York, 1998.

G. Wahba, *Support vector machines, reproducing kernel Hilbert spaces and the randomized GACV*, in Advances in Kernel Methods: Support Vector Learning, B. Schölkopf, C. Burges, and A. Smola, eds., MIT Press, 1999, pp. 69-88.

B. Zadrozny and C. Elkan, *Learning and making decisions when costs and probabilities are both unknown*, Tech. Report CS2001-0664, UCSD, 2001.

I. Androutsopoulos, J. Koutsias, K. Chandrinos, G. Paliouras, and C. Spyropoulos. An Evaluation of Naïve Bayesian Anti-Spam Filtering. In G. Potamias, V. Moutakis, and M. van Someren, editors, *Proceedingd of the Workshop on Machine Learning in the New Information Age: $11^{th}$ Eurpoean Conference on Machine Learning (ECML 2000)*, pp. 9-17. 2000.

I. Androutsopoulos, J. Koutsias, K. Chandrinos, G. Paliouras, and C. Spyropoulas. An Experimental Comparison of Naïve Bayesian and Keyword-Based Anti-Spam Filtering and Encrypted Personal E-mail Messages. In N. Belkin, P. Ingwersen, and M. Leong, editors, *Proceedings of the $23^{rd}$ Annual International ACM SIGIR Conference on Research and Development in Information Retrieval (SIGIR 2000)*, pp. 160-167. 2000.

I. Androutsopoulos, G. Paliouras, V. Karkaletsis, G. Sakkis, C. Spyropoulos, and P. Stamatopoulos. Learning to Filter Spam E-Mail: A Comparison of a Naïve Bayesian and a Memory-Based Approach. In H. Zaragoza, P. Gallinari, and M. Rajman, editors, *Proceedings of the Workshop on Machine Learning and Textual Information Access, $4^{th}$ European Conference on Principles and Practice of Knowledge Discovery in Databases (PKDD 2000)*, pp. 1-13. 2000.

A. Bradley, The use of the area under the ROC curve in the evalution of machine learning algorithms, *Pattern Recoginization*, 30(7):1145-1159, 1997.

S. Brin, J. Davis, and H. Garcia-Molina. Copy detection mechanisms for digital documents. In *Proceeding of SIGMOD*, pp. 398-409, 1995.

Broder. On the resemblance and containment of documents. SEQS: *Sequences '91, 1998*.

C. Buckley, C. Cardie, S. Mardisa, M. Mitra, D. Pierce, K. Wagstaff, and J. Waltz. The smart/empire tipster ir system. In *TIPSTER Phase III Proceedings*. Morgan Kaufmann, 2000.

A. Chowdbury, O. Frieder, D. A. Grossman, and M. C. McCabe. Collection statistics for fast duplicate document detection. *ACM Transactions on Information Systems*, 20(2):171-191, 2002.

W. Cohen. Fast effective rule induction. In *Proceedings of the Twelfth International Conference on Machine Learning*, 1995.

W. Cohen. Learning Rules that classify E-Mail. In *Proceedings of the 1996 AAAI Spring Symposium on Machine Learning in Information Access*, 1996.

J. Diederich, J. Kindermann, E. Leopold, and G. Paass. Authorship Attribution with Support Vector Machines. In *Proceedings of the Learning Workshop*, Snowbird, Utah, 2000.

H. Drucker, D. Wu, And V. Vapnik. Support Vector Machines for Spam Categorization. *IEEE Transactions on Neural Networks*, 10(5):1048-1054, 1999.

S. Eyheramendy, D. Lewis, and D. Madigan. On the Naïve Bayes model for text categorization. In *Proceedings of the Ninth International Workshop on Artificial Intelligence and Statistics,* 2003.

T. Fawcett. ROC graphs: Notes and practical considerations. Technical Report HPL-2003-4, HP Labs, 2003.

N. Heintze. Scalable document fingerprinting. In *1996 USENIX Workshop on Electronic Commerce,* Nov. 1996.

J. G. Hidalgo, M. M. López, and E. P. Sanz. Combing Text and Heuristics for Cost-Sensitive Spam Filtering. In *Proceedings of the Computational Natural Language Learning Workshop, CoNLL-2000,* Lisbon, Portugal, 2000. Association for Computational Linguistics.

T. C. Hoad and J. Zobel. Methods for identifying versioned and plagiarized documents. *Journal of the American Society for Information Science and Technology,* 2002.

H. Kaitarai. Filtering Junk E-Mail: A Performance Comparison between Genetic Programming and Naïve Bayes. Technical Report (presented at the Fall 1999 Meeting of the CMU Text Learning Group), Department of Electrical and Computer Engineering, University of Waterloo, Nov. 1999.

J. Kleinberg. Bursty and hierarchical structure in streams. In *Proceedings of the Eight ACM SIGKDD International Conference on Knowledge Discovery and Data Mining (KDD-2002),* 2002.

A. Kolcz and J. Alspector. SVM-based filtering of e-mail spam with content-specific misclassification costs. In *Proceedings of the Workshop on Text Mining (TextDM'2001),* 2001.

D. D. Lewis. Naïve (Bayes) at forty: the independence assumption in information retrieval. In *Proceedings of the 10th European Conference on Machine Learning,* pp. 4-15, 1998.

Y. Li, H. Zaragoza, R. Herbrich, J. Shawe-Taylor, and J. Kandola. The perception algorithm with uneven margins. In *Proceedings of ICML 2002,* pp. 379-386, 2002.

A. McCallum and K. Nigam. A comparison of event models for Naïve Bayes text classification. In proceedings of the AAAI-98 *Workshop on Learning for Text Categorization,* 1998.

A. McCallum, K. Nigam, and L. Ungar. Efficient clustering of high-dimensional data sets with application to reference matching. In *Proceedings of the Sixth ACM SIGKDD International Conference on Knowledge Discovery and Data Mining (KDD-2000),* 2000.

P. Pantel and D. Lin. SpamCop: A Spam Classification & Organization Program. In *Learning for Text Categorization: Papers from the 1998 Workshop,* Madison, Wisconsin, 1998. AAAI Technical Report WS-98-05.

F. Provost and T. Fawcett. Robust Classification for Imprecise Enviroments. *Machines Learning,* 42:203-231, 2001.

J. Provost, Naïve-Bayes vs. Rule-Learning in Classification of Email. Technical report, Dept. of Computer Sciences at the U. of Texas at Austin, 1999.

M. Redmond and B. Adelson. AlterEgo E-Mail Filtering Agent – Using CBR as a Service. In *Proceedings of the Workshop on case-Based Reasoning Integrations at the National Conference on Artificial Intelligence (AAAI-98).* AAAI Press 1998.

J. Rennie. Ifile: An Application of Machine Learning to E-mail Filtering. In *Proceedings of the KDD-2000 Workshop on Text Mining,* 2000.

J. D. M. Rennie. Improving multi-class text classification with Naïve Bayes. Technical Report AITR-2001-004, Massachuesetts Institute of Technology, 2001.

M. Sahami, S. Dumais, D. Heckerman, and E. Horvitz. A Bayesian Approach to Filtering Junk E-Mail. In *Proceedings of the AAAI-98 Workshop on Learning for Text Categorization,* 1998.

G. Sakkis, I. Androutsopoulso, G. Paliouras, V. Karkaletsis, C. Spyropoulos, and P. Stamatopoulos. Stacking Classifiers for Anti-Spam Filtering of E-Mail. In L. Lee and D. Harman editors, *Proceedings of the 6th Conference on Empirical Methods in natural Language Proceedings (EMNLP 2001),* pp. 44-50. Carnegie Mellon University, 2001.

G. Salton, C. Yang, and A. Wong. A vector-space model for automatic indexing. *Communications of the ACM, 18,* 1975.

M. Sanderson. Duplicate detection in the Reuters collection. Technical Report TR-1997-5, Department of Computing Science, University of Glasgow, 1997.

S. Sarawagi and A. Bhamidipaty. Interactive deduplication using active learning. In *Proceedings of the Eighth ACM SIGKDD International conference on Knowledge Discovery and Data Mining (KDD-2002),* 2002.

G. Schohn and D. Cohn. Less is more: *Active learning with support vector machines. In Proc. 17th International Conf. on Machine Learning,* pp. 839-846. Morgan Kaufmann, San Francisco, CA, 2000.

R. Segal and J. Kephart. Mailcat: An Intelligent Assistant for Organizing E-Mail. In *Proceedings of the Third International Conference on Automous Agents.* 1999.

R. Segal and J. Kephart. Incremental Learning in SwiftFile. In Proceedings of the Seventh International Conference on Machine Learning, 2000.

N. Shivakumar and H. Garcia-Monlina, SCAM: A copy detection mechanism for digital documents. *In Proceedings of 2nd International Conference in Theory and Practice of Digital Libraries (DL'95), Austin, Texas 1995.*

G. Weiss and F. Provost. The effect of class distribution on classifier learning: An empirical study. technical Report ML-TR-44, Department of Computer science, Rutgers University, 2002.

W. E. Winkler. The state of record linkage and current research problems. Technical report, Statistical Research Division, U.S. Bureau of Census, Washington, DC, 1999.

Y. Yang and J. P. Pedersen. A comparative study on feature selection in text categorization. In *Proceedings of the Fourteenth International Conference on Machine Learning (ICML '97), pp. 412-420, 1997.*

* cited by examiner

CLASSIFIER TUNING BASED ON DATA SIMILARITIES

CLAIM OF PRIORITY

This application claims priority under 35 USC §119(e) to U.S. Provisional Patent Application Ser. No. 60/442,124, filed on Jan. 24, 2003, the entire contents of which are hereby incorporated by reference.

TECHNICAL FIELD

This description relates to classifiers.

BACKGROUND

With the advent of the Internet and a decline in computer prices, many people are communicating with one another through computers interconnected by networks. A number of different communications mediums have been developed to facilitate such communications between computer users. A prolific communication medium is electronic mail (e-mail).

Email participants seem to receive an ever increasing number of mass, unsolicited, commercial e-mailings (colloquially known as e-mail spam or spam e-mail). Spam e-mail is akin to junk mail sent through the postal service. However, because spam e-mail requires neither paper nor postage, the costs incurred by the sender of spam e-mail are quite low when compared to the costs incurred by conventional junk mail senders. Consequently, e-mail users now receive a significant amount of spam e-mail on a daily basis.

Spam e-mail impacts both e-mail users and e-mail providers. For e-mail users, spam e-mail can be disruptive, annoying, and time consuming. For e-mail and network service providers, spam e-mail represents tangible costs in terms of storage and bandwidth usage, which costs are not negligible due to the large number of spam e-mails being sent.

SUMMARY

In one aspect, a data item classifier is set up by accessing data items of known classification; removing substantially similar items from the data items to identify unique data items; and configuring the data item classifier, based on the unique data items, for future classification of at least one data item of unknown class. The configuring results in the data item classifier being capable of determining a measure that a data item of unknown class belongs to a particular class.

Implementations of this aspect may include one or more of the following features. For example, accessing the data items may include accessing a set of training data items; removing substantially similar items may include removing substantially similar items from the set of training data items to obtain a set of unique training data items; and configuring the data item classifier may include training a scoring classifier to develop a classification model based on the set of unique training data items, wherein the classification model enables the scoring classifier to determine a measure for at least one data item of unknown classification.

Training the scoring classifier may include analyzing the set of unique training data items to identify n features in the set of unique training data items and forming an n-by-m feature matrix. M is equal to the number of unique training data items in the set of unique training data items such that each row of the n-by-m feature matrix corresponds to one of the training data items in the set of training data items and entries in each row of the n-by-m feature matrix indicate which of the n features a corresponding training data item contains. Training the scoring classifier also may include reducing the n-by-m feature matrix to a N-by-m reduced feature matrix, where N is less than n; inputting each row of the N-by-m reduced feature matrix, along with the known classification of the training data item corresponding to the input row, into the scoring classifier such that the scoring classifier develops the classification model.

Accessing the data items may include accessing a set of evaluation data items. Removing substantially similar items may include removing substantially similar items from the set of evaluation data items to obtain a set of unique evaluation data items. Configuring the data item classifier may include determining and setting the classification threshold based on the set of unique evaluation data items.

Determining and setting the classification threshold may include obtaining feature data for at least one of the unique evaluation data items by determining whether the evaluation data item has a predefined set of features; inputting the feature data into the scoring classifier to obtain a classification output for the evaluation data item; determining a threshold value that reduces misclassification costs based on the classification output for the at least one evaluation data item and the known classification of the at least one evaluation data item; and setting the initial value of the classification threshold to the determined threshold value. Determining a threshold value that reduces misclassification costs may include determining a threshold value that minimizes misclassification costs.

The data items may be e-mails, such that, after configuration, the data item classifier may be used to filter out spam e-mail in a set of received e-mails of unknown classification.

The misclassification costs may depend on varying costs of misclassifying subcategories of non-spam e-mail as spam e-mail.

In another aspect, a classification threshold of a data item classifier is adjusted based on received data items. The data item classifier classifies an incoming data item as a member of a particular class when a comparison of a classification output for the incoming data item to the classification threshold indicates the data item belongs to the particular class. To adjust the classification threshold, the similarity rate for unique data items in the received data items is determined. A threshold value for the classification threshold that reduces misclassification costs based on, at least in part, the similarity rate for unique data items in the received data items is determined; and the classification threshold is set to the threshold value.

Implementations of this aspect may include one or more of the following features. For example, for at least one received data item, a classification output indicative of whether or not the data item belongs to the particular class may be obtained. The threshold value for the classification threshold that reduces misclassification costs may be determined also based on, at least in part, the classification output of the at least one data item.

Obtaining a classification output for the at least one data item may include obtaining feature data for the data item by determining whether the data item has a predefined set of features; inputting the feature data into a probabilistic classifier to obtain a probability measure; and producing a classification output based on the probability measure.

A class indication for the at least one data item may be received; and the value for the classification threshold that reduces misclassification costs may be determined also based on, at least in part, the class indication of the at least one data item.

Determining a value for the classification threshold may include determining a value that minimizes:

$$L(v) = \sum_{x} P(x|v)(P(s|x, v)[F(x) = l] + \text{cost}(x, v) \cdot P(l|x, v)[F(x) = s])$$

where v represents a particular similarity rate, P(x|v) is the probability that the particular data item x occurs given the particular similarity rate v, P(s|x,v) is the probability that the data item x is the particular class given the particular similarity rate v, P(1|x,v) is the probability the particular data item x is not the particular class given the particular similarity rate v, [F(x)=s] is equal to one when an e-mail x is classified as a member of the particular class, zero otherwise, [F(x)=1] is equal to one when an e-mail x is not classified as a member of the particular class, zero otherwise, and cost (x,v) represents an assigned cost of misclassifying data items that are not members of the particular class as members of the particular class.

Determining a threshold value that reduces misclassification costs may include determining a threshold value that minimizes misclassification costs. The data items may be e-mails and the particular class is spam, such that the data item classifier is used to filter out spam e-mail in a set of received e-mails of unknown classification. The misclassification costs may depend on varying costs of misclassifying subcategories of non-spam e-mail as spam e-mail.

In another aspect, an e-mail classifier determines whether at least one received e-mail should be classified as spam. The e-mail classifier includes a feature analyzer, a scoring classifier, a threshold comparator, a grouper, and a threshold selector. The feature analyzer obtains feature data for the e-mail by determining whether the e-mail has a predefined set of features. The scoring classifier provides a classification output indicative of whether or not the e-mail is spam based on the feature data, wherein the scoring classifier is trained using a set of unique training e-mails. The threshold comparator compares the classification output to a classification threshold and the e-mail is classified as spam when the comparison of the classification output to the classification threshold indicates the e-mail is spam. The grouper periodically determines the similarity rate for unique e-mails in the set of received e-mails. The threshold selector selects and sets a value for the classification threshold. The threshold selector selects and sets an initial value for the classification threshold that reduces misclassification costs based on a unique set of evaluation e-mails and the threshold selector selects and sets a new value for the classification threshold that reduces costs based at least on the similarity rates determined by the duplicate detector.

Implementations of this aspect may include one or more of the following features. For example, the threshold selector may select and set a new value for the classification threshold also based on a classification output for at least one e-mail in the set of received e-mails. The threshold selector also may select and set a new value for the classification threshold based on a class indication for the at least one e-mail.

In another aspect, an e-mail server includes a e-mail classifier and a mail handler. The e-mail classifier has a classification threshold that is adjusted according to similarity rates of unique e-mails received in an incoming e-mail stream. The e-mail classifier is configured to classify e-mails in an incoming e-mail stream as spam or legitimate based on a comparison of a classification output to a classification threshold, where the classification output is indicative of whether the incoming e-mail is spam. The mail handler handles an e-mail based on the class given to the e-mail by the e-mail classifier.

The e-mail classifier may include a feature analyzer, a scoring classifier, a threshold comparator, a grouper, and a threshold selector. The feature analyzer obtains feature data for the e-mail by determining whether the e-mail has a predefined set of features. The scoring classifier provides a classification output indicative of whether or not the e-mail is spam based on the feature data, wherein the scoring classifier is trained using a set of unique training e-mails. The threshold comparator compares the classification output to a classification threshold and the e-mail is classified as spam when the comparison of the classification output to the classification threshold indicates the e-mail is spam. The grouper periodically determines the similarity rate for unique e-mails in the set of received e-mails. The threshold selector selects and sets a value for the classification threshold. The threshold selector selects and sets an initial value for the classification threshold that reduces misclassification costs based on a unique set of evaluation e-mails and the threshold selector selects and sets a new value for the classification threshold that reduces costs based at least on the similarity rates determined by the duplicate detector. The threshold selector may select and set a new value for the classification threshold also based on a classification output for at least one e-mail in the set of received e-mails. The threshold selector also may select and set a new value for the classification threshold based on a class indication for the at least one e-mail.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

In general, a classifier is used to classify data items of unknown classification in a data stream. The classifier classifies a data item by determining a measure indicative of a degree of correlation between the data item and a particular class, producing a classification output based on the measure, and comparing the classification output to a classification threshold.

However, before the classifier is used to classify unknown data items, the classifier is configured—typically in at least the two following phases. In the first phase, the classifier is trained using a set of unique training data items (i.e., a data set that does not contain substantially similar data items) of known classification, enabling the classifier to determine a measure for unknown data items. In the second phase, an initial classification threshold is set. Similar to the training in the first phase, the initial classification threshold is determined using a set of unique evaluation data items of known classification, such that misclassifications costs are reduced with respect to the set of unique evaluation data items.

Unique data sets are used in each phase to prevent the classifier from being improperly biased. The classification threshold of the classifier may be biased when the classifier is configured using training and evaluation sets that have similarity rates (i.e., rate at which substantially similar emails are encountered) that do not reflect similarity rates encountered when the classifier is used to classify unknown data items in a data stream. Using properly chosen unique sets of data items helps to remove such bias. Then, when the classifier is used to classify unknown items, information regarding the actual similarity rates of data items in the data stream is obtained and used to adjust the classification threshold such that misclassification costs are reduced given the actual similarity rates.

The adjustment of the classification threshold to reduce misclassification costs can be performed using the information regarding actual similarity rate regardless of whether the classifier has been trained using unique data items.

The description that follows primarily describes an application of these techniques to e-mail spam filtering. However, the techniques may be used for spam filtering in other messaging mediums, both text and non-text (e.g., images). For example, these techniques may be used for filtering spam sent using instant messaging, short messaging services (SMS), or Usenet group messaging.

Moreover, these techniques may be applied to other classification problems in which the similarity rate in the training and/or evaluation data is not likely to reflect the similarity rate experienced when classifying unknown data items, but in which information about the similarity rate during operation can be obtained.

Figure 1:
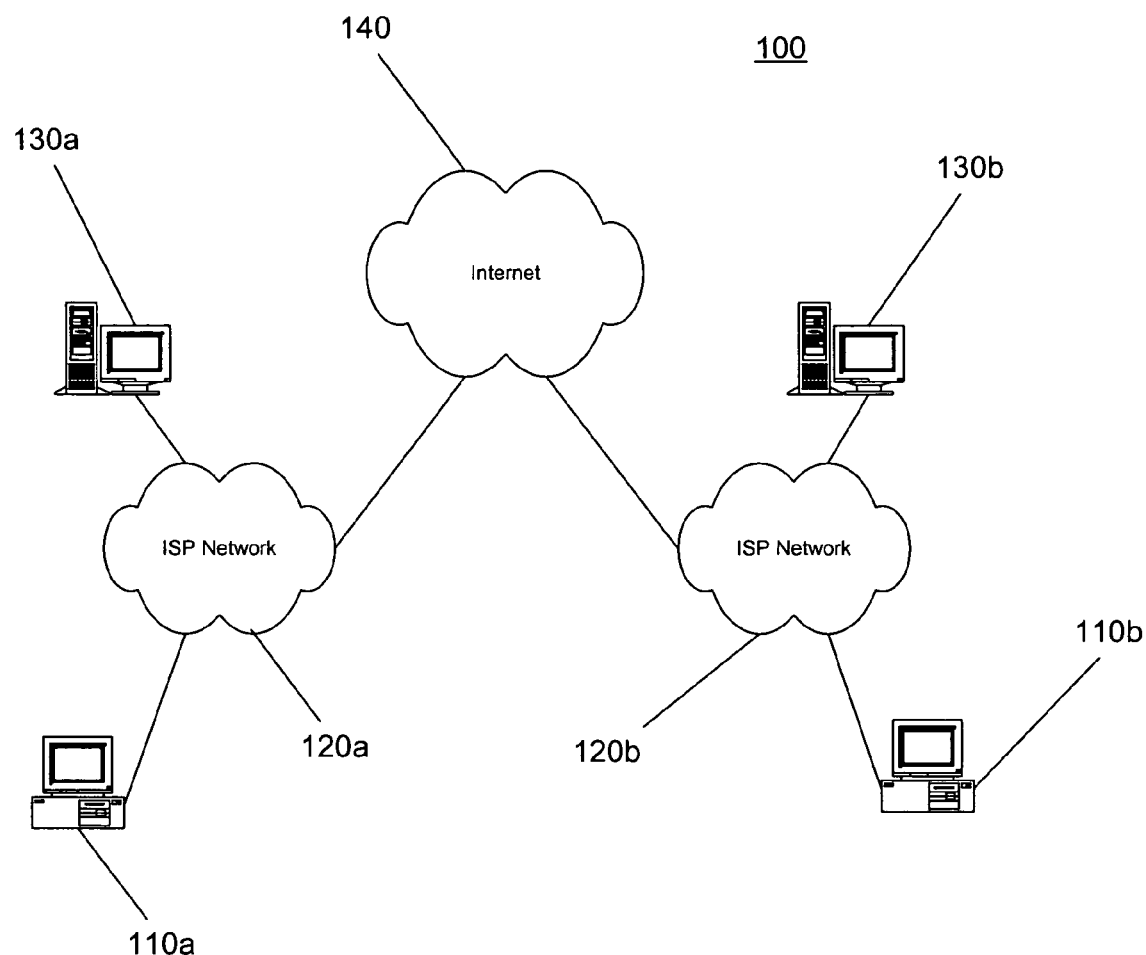
FIG. 1 illustrates an exemplary networked computing environment that supports e-mail communications and in which spam filtering may be performed.

FIG. 1 illustrates an exemplary networked computing environment 100 that supports e-mail communications and in which spam filtering may be performed. Computer users are distributed geographically and communicate using client systems 110a and 110b. Client systems 110a and 110b are connected to ISP networks 120a and 120b, respectively. While illustrated as ISP networks, networks 120a or 120b may be any network, e.g., a corporate network. Clients 110a and 110b may be connected to the respective ISP networks 120a and 120b through various communication mediums, such as a modem connected to a telephone line (using, for example, serial line internet protocol (SLIP) or point-to-point protocol (PPP)) or a direct network connection (using, for example, transmission control protocol/internet protocol (TCP/IP)), a wireless Metropolitan Network, or a corporate local area network (LAN). E-mail servers 130a and 130b also are connected to ISP networks 120a and 120b, respectively. ISP networks 120a and 120b are connected to a global network 140, e.g. the Internet, such that a device on one ISP network can communicate with a device on the other ISP network. For simplicity, only two ISP networks, 120a and 120b, have been illustrated as being connected to Internet 140. However, there may be a great number of such ISP networks connected to Internet 140. Likewise, each ISP network may have many e-mail servers and many client systems connected to the ISP network.

Each of the client systems 110a and 110b and e-mail servers 130a and 130b may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 110a and 110b and e-mail servers 130a and 130b may receive instructions from, for example, a software application, a program, a piece of code, a device, a computer, a computer system, or a combination thereof, which independently or collectively direct operations. These instructions may take the form of one or more communications programs that facilitate communications between the users of client systems 110a and 110b. Such communications programs may include, for example, e-mail programs, IM programs, file transfer protocol (FTP) programs, or voice-over-IP (VoIP) programs. The instructions may be embodied permanently or temporarily in any type of machine, component, equipment, storage medium, or propagated signal that is capable of being delivered to a client system 110a and 10b or the e-mail servers 130a and 130b.

Each client system 110a and 110b and e-mail server 130a and 130b includes a communications interface (not shown) used by the communications programs to send communications. The communications may include audio data, video data, general binary data, or text data (e.g., data encoded in American Standard Code for Information Interchange (ASCII) format).

Examples of ISP networks 120a and 120b include Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network. Networks 120a and 120b may include multiple networks or subnetworks, each of which may include, for example, a wired or wireless data pathway.

E-mail server 130a or 130b may handle e-mail for many thousands of (if not more) e-mail users connected to ISP network 110a or 110b. E-mail server 130a or 130b may handle e-mail for a single e-mail domain (e.g., aol.com) or for multiple e-mail domains. E-mail server 130a or 130b may be composed of multiple, interconnected computers working together to provide e-mail service for e-mail users of ISP network 110a or 130b.

An e-mail user, such as a user of client system 110a or 110b may have one or more e-mail accounts on e-mail server 130a or 130b. Each account corresponds to an e-mail address. Each account may have one or more folders in which e-mail is stored. E-mail sent to one of the e-mail user's e-mail addresses is routed to e-mail server 130a or 130b and placed in the account that corresponds to the e-mail address to which the e-mail was sent. The e-mail user then uses, for example, an e-mail client program executing on client system 110*a* or 110*b* to retrieve the e-mail from e-mail server 130*a* or 130*b* and view the e-mail.

The e-mail client program may be, for example, a stand-alone e-mail application such as Microsoft Outlook or an e-mail client application that is integrated with an ISP's client for accessing the ISP's network, such as America Online (AOL) Mail, which is part of the AOL client. The e-mail client program also may be, for example, a web browser that accesses web-based e-mail services.

The e-mail client programs executing on client systems 110*a* and 110*b* also may allow one of the users to send e-mail to an e-mail address. For example, the e-mail client program executing on client system 110*a* allows the e-mail user of client system 110*a* (the sending user) to compose an e-mail message and address it to a recipient address, such as an e-mail address of the user of client system 110*b*. When the sending user indicates that an e-mail is to be sent to the recipient address, the e-mail client program executing on client system 110*a* communicates with e-mail server 130*a* to handle the transmission of the e-mail to the recipient address. For an e-mail addressed to an e-mail user of client system 110*b*, for example, e-mail server 130*a* sends the e-mail to e-mail server 130*b*. E-mail server 130*b* receives the e-mail and places it in the account that corresponds to the recipient address. The user of client system 110*b* then may retrieve the e-mail from e-mail server 130*b*, as described above.

In an e-mail environment such as that shown, a spammer typically uses an e-mail client or server program to send similar spam e-mails to hundreds, if not millions, of e-mail recipients. For example, a spammer may target hundreds of recipient e-mail addresses serviced by e-mail server 130*b* on ISP network 120*b*. The spammer may maintain the list of targeted recipient addresses as a distribution list. The spammer may use the e-mail program to compose a spam e-mail and instruct the e-mail client program to use the distribution list to send the spam e-mail to the recipient addresses. The e-mail then is sent to e-mail server 130*b* for delivery to the recipient addresses. Thus, in addition to receiving legitimate e-mails (i.e., non-spam e-mails), e-mail server 130*b* also may receive large quantities of spam e-mail, particularly when many spammers target e-mail addresses serviced by e-mail server 130*b*.

Figure 2:
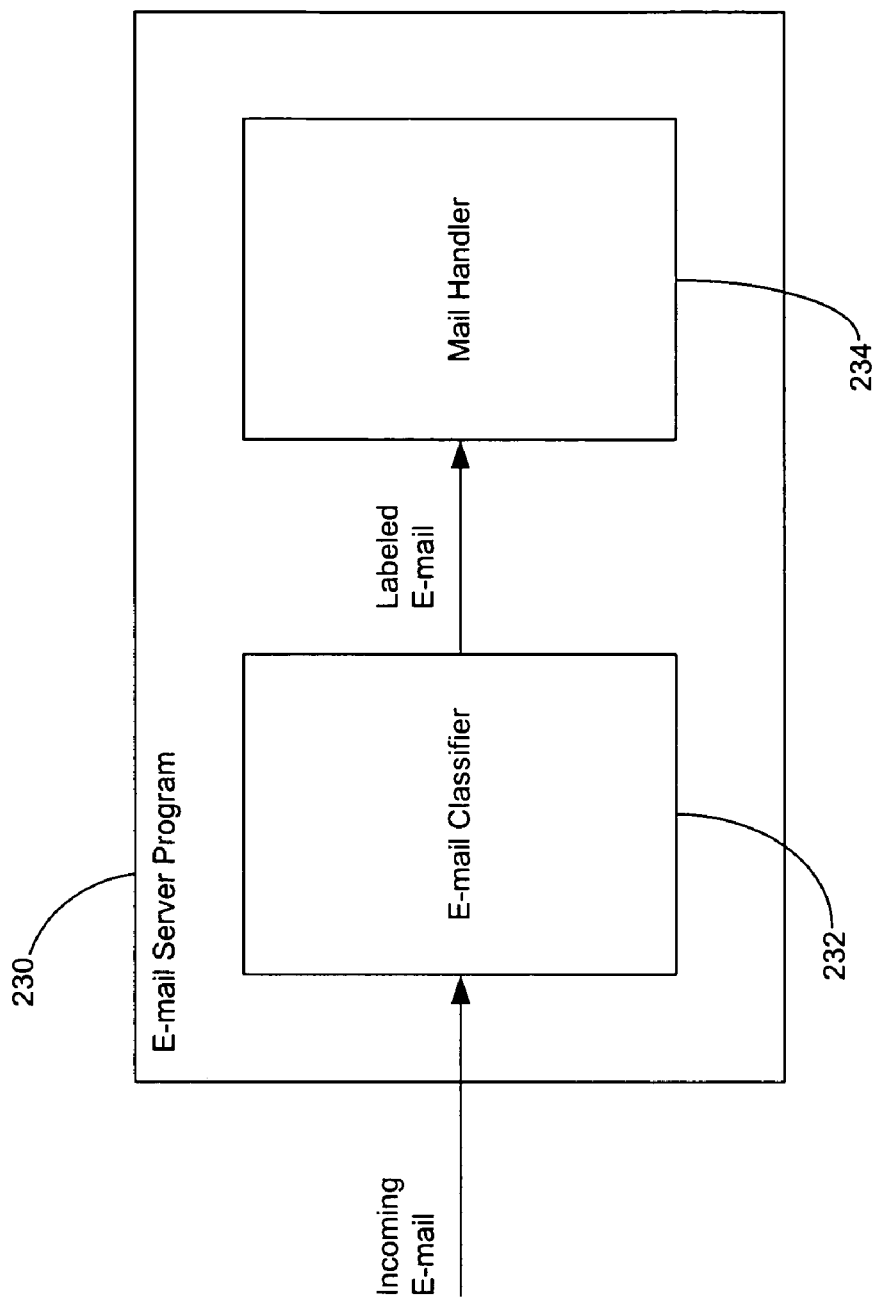
FIG. 2 is a high-level functional block diagram of an e-mail server program that may execute on an e-mail server to provide large-scale spam filtering.

FIG. 2 is a high-level functional block diagram of an e-mail server program 230 that may execute on an e-mail server, such as e-mail server 130*a* or 130*b*, to provide large-scale spam filtering. E-mail server program 230 includes a probabilistic e-mail classifier 232 and a mail handler 234. During operation, the incoming e-mail arriving at e-mail server program 230 passes through probabilistic e-mail classifier 232. E-mail classifier 232 classifies incoming e-mail by making a determination of whether or not a particular e-mail passing through classifier 232 is spam or legitimate e-mail (i.e., non-spam e-mail) and labeling the e-mail accordingly (i.e., as spam or legitimate). E-mail classifier 232 forwards the e-mail to mail handler 234 and mail handler 234 handles the e-mail in a manner that depends on the policies set by the e-mail service provider. For example, mail handler 234 may delete e-mails marked as spam, while delivering e-mails marked as legitimate to an "inbox" folder of the corresponding e-mail account. Alternatively, e-mail labeled as spam may be delivered, to a "spam" folder or otherwise, instead of being deleted. The labeled mail may be handled in other ways depending on the policies set by the e-mail service provider.

As a probabilistic classifier, e-mail classifier 232 makes the determination of whether or not an e-mail is spam by analyzing the e-mail to determine a confidence level or probability measure that the e-mail is spam, and comparing the probability measure to a threshold. If the probability measure is above a certain threshold, the e-mail is labeled as spam.

Because classifier 232 is a probabilistic classifier, there is the chance that a spam e-mail will be misclassified as legitimate and that legitimate e-mail will be classified as spam. There are generally costs associated with such misclassifications. For the e-mail service provider, misclassifying spam e-mail as legitimate results in additional storage costs, which might become fairly substantial. In addition, failure to adequately block spam may result in dissatisfied customers, which may result in the customers abandoning the service. The cost of misclassifying spam as legitimate, however, may generally be considered nominal when compared to the cost of misclassifying legitimate e-mail as spam, particularly when the policy is to delete or otherwise block the delivery of spam e-mail to the e-mail user. Losing an important e-mail may mean more to a customer than mere annoyance. Cost, therefore, may take into account factors other than just monetary terms.

In addition to a variation in misclassification costs between misclassifying spam e-mail as legitimate e-mail and misclassifying legitimate e-mail as spam e-mail, there may be a variation in the costs of misclassifying different categories of legitimate e-mail as spam. For instance, misclassifying personal e-mails may incur higher costs than misclassifying work related e-mails. Similarly, misclassifying work related e-mails might incur higher costs than misclassifying e-commerce related e-mails, such as order or shipping confirmations.

Before classifier 232 is used to classify incoming e-mail, classifier 232 is trained and the threshold is set to minimize such misclassification costs. Classifier 232 is trained using a training set of e-mail to develop an internal model that allows classifier 232 to determine a probability measure for unknown e-mail. Evaluation e-mail then is used to set the initial classification threshold of classifier 232 such that misclassification costs are minimized. In some implementations, misclassification costs also may be taken into account during classifier training. In these implementations, evaluation e-mail is used in the same manner to set the initial threshold, but the resulting threshold may differ because different probability measures will occur as a result of the difference between training in a manner that includes misclassification costs versus one that does not include misclassification costs.

Before training and setting the initial threshold, substantially similar e-mails are removed from both the training set and the evaluation set to prevent the classifier 232 from being improperly biased based on a rate or quantity of substantially similar e-mails in the training and evaluation sets that do not reflect the rate or quantity that would occur during classification. E-mail systems tend to be used by any given spammer to send the same or similar spam e-mail to a large number of recipients during a relatively short period of time. While the content of each e-mail is essentially the same, it normally varies to a degree. For example, mass e-mailings often are personalized by addressing the recipient user by their first/last name, or by including in the e-mail message body the recipient user's account number or zip code.

Also, spammers may purposefully randomize their e-mails so as to foil conventional spam detection schemes, such as those based on matching exact textual strings in the e-mail. Usually, the core of the e-mail remains the same, with random or neutral text added, often confusing such "exact-match" spam filters. For instance, the extra text may be inserted in such a way that it is not immediately visible to the users (e.g., when the font has the same color as the background). Other randomization strategies of spammers include: appending random character strings to the subject line of the e-mail, changing the order of paragraphs, or randomizing the non-alphanumeric content. Moreover, spammers are likely to send large numbers of substantially similar e-mails, which may include the slight and purposefully introduced variations mentioned above and which, therefore, are not truly identical. One characteristic of spam e-mail is that essentially the same content tends to be sent in high volume. As a result, a measure of the number of substantially similar copies of a particular e-mail in an e-mail stream provides a good indicator of whether that e-mail is spam or not.

The training and evaluation sets, however, may not be representative of the actual duplication rate of e-mails examined during classification, due in part to a likelihood of a sample selection bias in the training and evaluation sets. For instance, personal e-mails may be hard to obtain because of privacy concerns, while spam and bulk mail may be easily obtained for training and initial threshold setting. In this case, the same e-mail may be duplicated a number of times in the collected sample, but the similarity rate or message multiplicity may not reflect the actual similarity rate that will occur during classification. In addition, the similarity rate may change during classification simply because of spammers changing their e-mail and/or the rate at which they are sending e-mails.

Such an inaccurate reflection of the actual similarity rates on the part of the training and evaluation e-mails may improperly bias a classifier during training (both through feature selection and in developing a classification model) and when setting the initial classification threshold. This potentially improper bias of classifier 232 is avoided by removing substantially similar e-mails from the training and evaluation sets and by adjusting the classifier threshold periodically or otherwise to account for the actual similarity rates of incoming e-mails.

Thus, over a period of time, the duplication rate of incoming e-mails is determined for the arriving e-mails. This empirical information, information about the class of some of the e-mails in the incoming stream (e.g., obtained from user complaints), and the classification outputs for the incoming e-mails during the period are used to adjust the threshold. Consequently, the classification threshold is adjusted during operation to account for the actual similarity rate of e-mails in the incoming stream.

Figure 3:
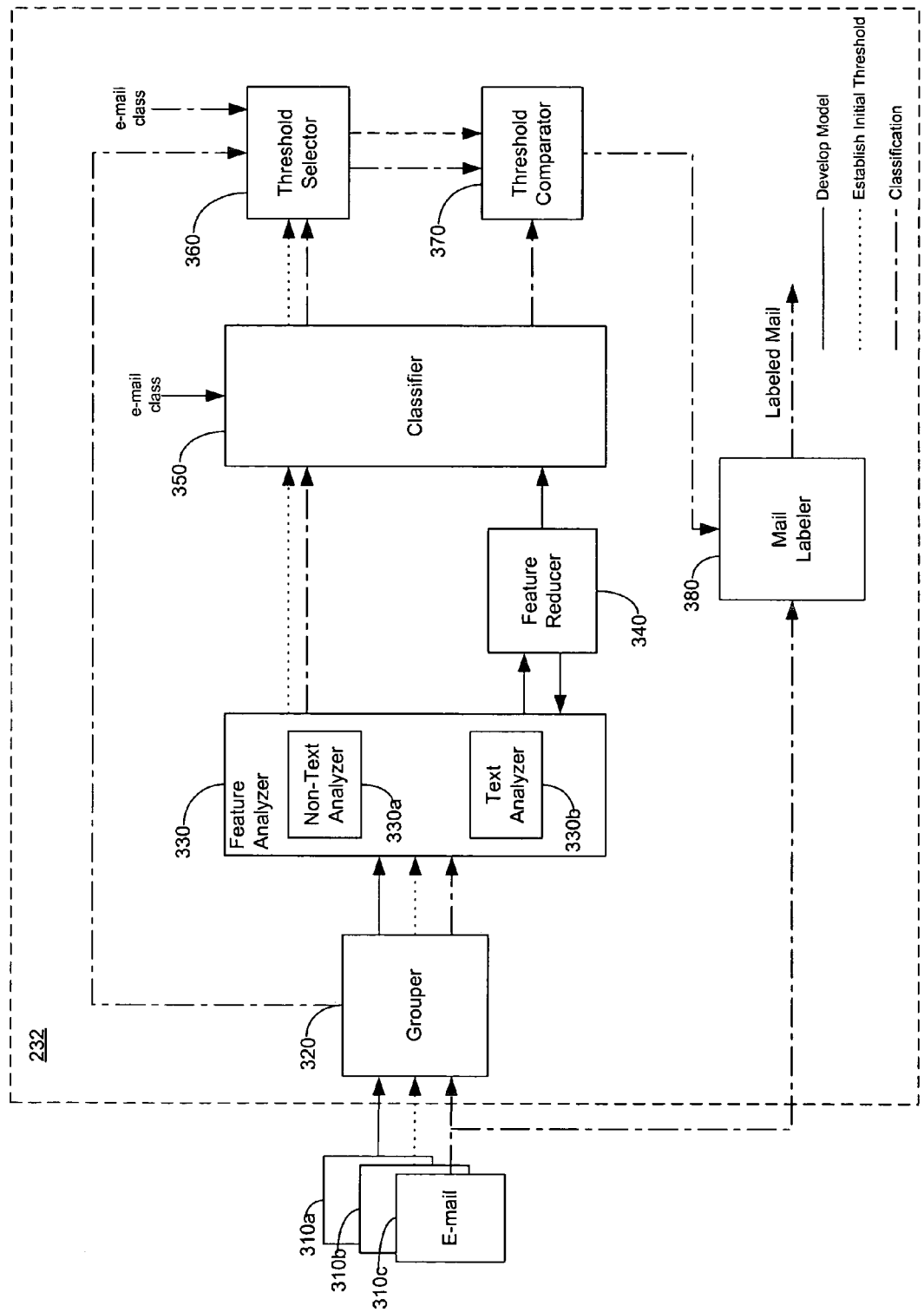
FIG. 3 is a functional block diagram of a probabilistic e-mail classifier.

FIG. 3 is a functional block diagram of one implementation of probabilistic e-mail classifier 232. E-mail classifier 232 includes a grouper 320, a feature analyzer 330, a feature reducer 340, a probabilistic classifier 350, a threshold selector 360, a threshold comparator 370, and a mail labeler 380. The various components of e-mail classifier 232 generally function and cooperate during three phases: training, optimization, and classification. To simplify an understanding of the operation of e-mail classifier 232 during each phase, the data flow between the various e-mail classifier 232 components is shown separately for each phase. A non-broken line is shown for data flow during the training phase, a line broken at regular intervals (i.e., dotted) indicates data flow during the initial threshold setting phase, and a broken line with alternating long and short dashed lines indicates the data flow during classification.

Figure 4A:
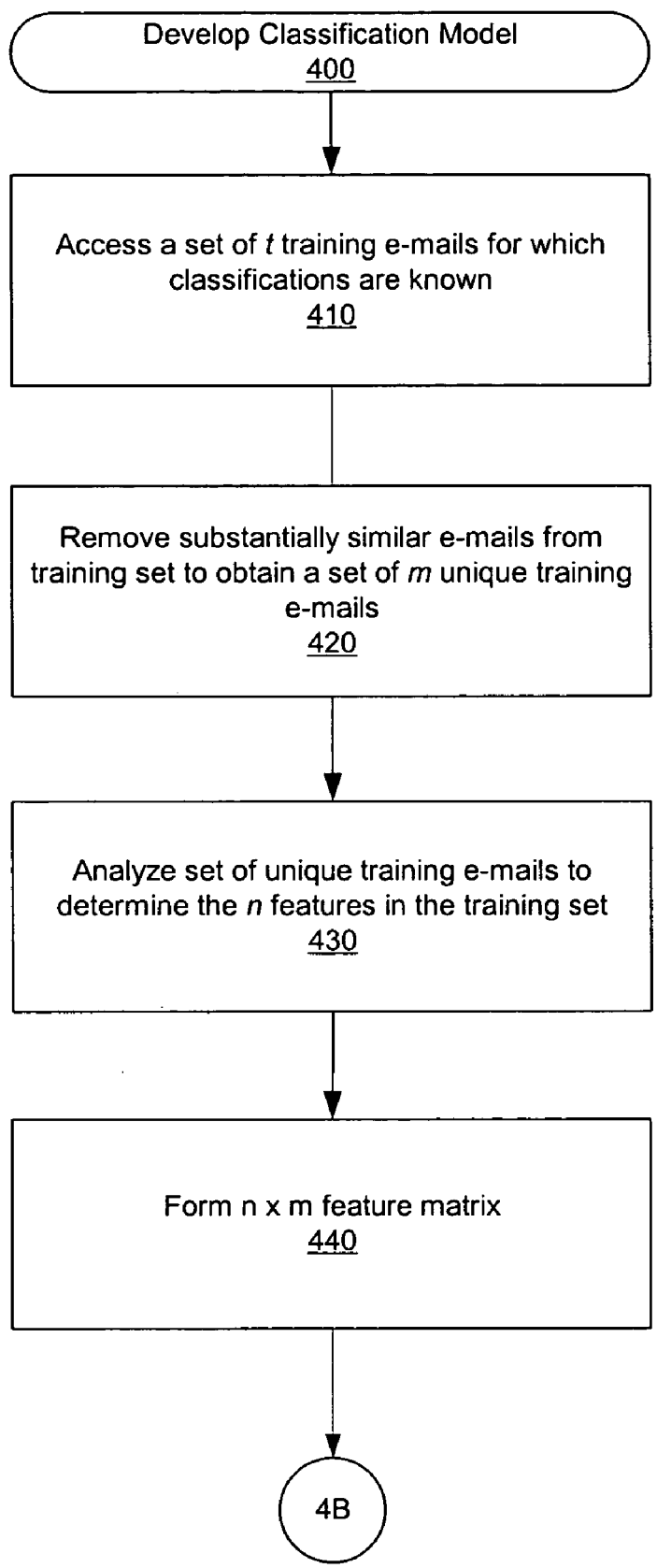
FIGS. 4A and 4B collectively provide a flow chart illustrating the process by which the probabilistic e-mail classifier of FIG. 3 is trained.
Figure 4B:
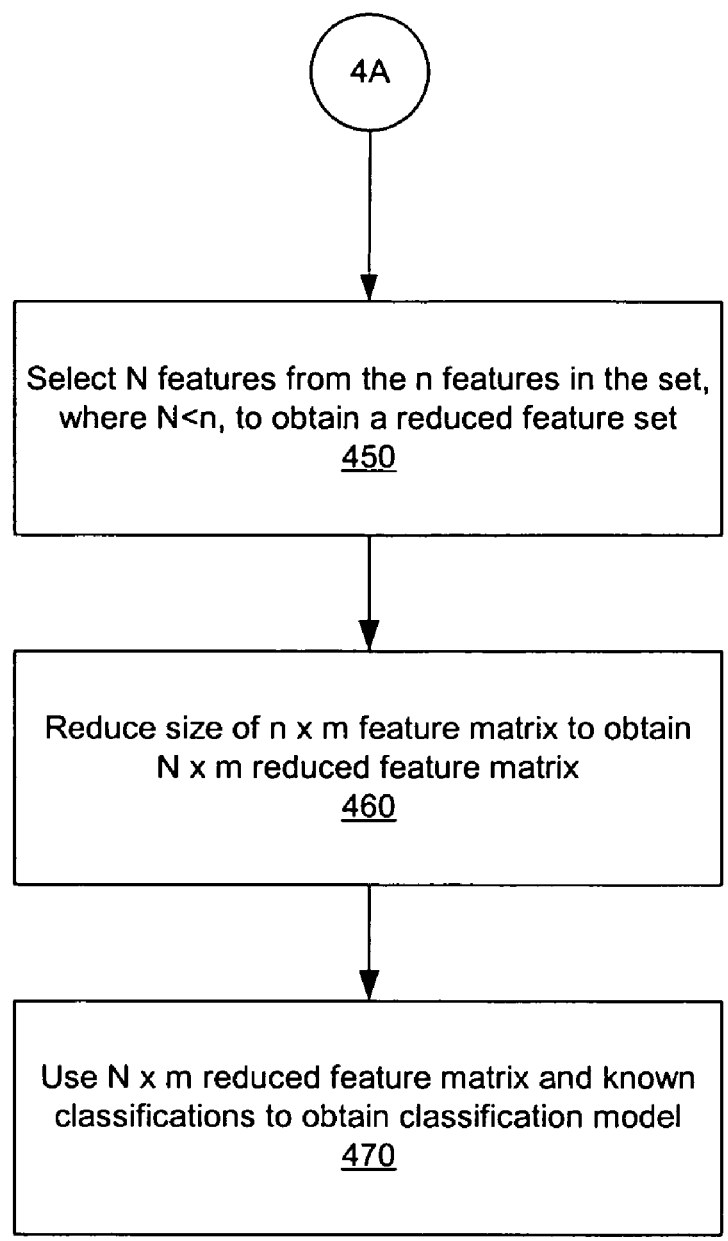

Referring to FIG. 4A, in general, during the training phase (i.e., when a classification model is developed) (400) a set of t e-mails (the "training e-mails") having a known classification (i.e. known as spam or legitimate) are accessed (410) and used to train classifier 232. To train classifier 232, substantially similar e-mails are removed from the set of t training e-mails to obtain a reduced set of m unique training e-mails (420). Each e-mail in the unique set of m training e-mails then is analyzed to obtain the n features (described further below) of the unique set of training e-mails (430) and to form an n-by-m feature matrix (440). Referring to FIG. 4B, feature selection is performed to select N features of the n feature set, where N<n (450), and the n-by-m feature matrix is reduced accordingly to an N-by-m reduced feature matrix (460). The N-by-m reduced feature matrix is used along with the known classification of the unique training e-mails to obtain an internal classification model (470).

More particularly, and with reference to the unbroken reference flowpath of FIG. 3, a t set of training e-mails 310$a$ is input into classifier 232 and applied to grouper 320. Grouper 320 detects substantially similar e-mails in the t set of training e-mails 310$a$, groups the detected duplicate e-mails, and selects a representative e-mail from within each group of substantially similar e-mails to form a reduced set of m unique training e-mails (410 and 420).

Grouper 320 may be implemented using known or future techniques for detecting substantially similar or duplicate documents that may or may not match exactly. For example, grouper 320 may be implemented using the I-Match approach, described in Chowdhury et al., "Collection Statistics For Fast Duplicate Document Detection," *ACM Transactions on Information Systems*, 20(2):171–191, 2002. The I-Match approach produces a single hash representation of a document and guarantees that a single document will map to one and only one cluster, while still providing for non-exact matching. Each document is reduced to a feature vector and term collection statistics are used to produce a binary feature selection-filtering agent. The filtered feature vector then is hashed to a single value for all documents that produced the identical filtered feature vector, thus producing an efficient mechanism for duplicate detection.

Other similarity detection approaches may be used. In general, current similarity or duplication detection techniques can be roughly classed as similarity-based techniques or fingerprint-based techniques. In similarity-based techniques, two documents are considered identical if their distance (according to a measure such as the cosine distance) falls below a certain threshold. Some similarity-based techniques are described in C. Buckley et al., *The Smart/Empire Tipster IR System*, in TIPSTER Phase III Proceedings, Morgan Kaufmann, 2000; T. C. Hoad & J. Zobel, *Methods of Identifying Versioned and Plagarised Documents*, Journal of the American Society for Information Science and Technology, 2002; and M. Sanderson, *Duplicate Detection in the Reuters Collection*, Tech. Report TR-1997-5, Department of Computing Science, University of Glasgow, 1997. In fingerprint-based techniques, two documents are considered identical if their projections onto a set of attributes results are the same. Some fingerprint-based techniques are described in S. Brin et al., *Copy Detection Mechanisms for Digital Documents*, in Proceedings of SIGMOD, 1995, pp. 398–409; N. Heintze, *Scalable Document Fingerprinting*, in 1996 USENIX Workshop on Electronic Commerce, November 1996; and Broder, *On the Resemblance and Containment of Documents*, SEQS: Sequences '91, 1998.

The set of m unique training e-mails are passed to feature analyzer 330 (430). During training, feature analyzer 330 analyzes the m set of unique training e-mails to determine n features of the set of m unique training e-mails (the "feature set"). The feature set may be composed of text and non-text features. Text features generally include the text in the bodies and subject lines of the e-mails. Non-text features may include various other attributes of the e-mails, such as formatting attributes (e.g., all caps), address attributes (e.g., multiple addressees or from a specific e-mail address), or other features of an e-mail message such as whether there is an attachment or image, audio or video features embedded in the e-mail.

Feature analyzer 330 includes a text analyzer 330b and a non-text analyzer 330a. During training, text analyzer 330b identifies text features of each e-mail message in the set of m unique training e-mails. Text analyzer 330b may tokenize each e-mail to determine the text features. A token is a textual component in the body or subject line and, for example, may be defined as letters separated from another set of letters by whitespace or punctuation. Text analyzer 330b keeps track of tokens and e-mails within which the tokens occur.

Non-text analyzer 330a determines whether each non-text feature is present in each e-mail. The exact non-text features for which each e-mail is analyzed typically is a matter of design and empirical judgment. For each non-text feature, a binary value is generated, indicating whether the feature is present or not.

Feature analyzer 330 creates a sparse n-by-m feature matrix (where n is the total number of text and non-text features) from the results of text analyzer 330b and non-text analyzer 330a (440). Each entry in the matrix is a binary value that indicates whether the $n^{th}$ feature is present in the $m^{th}$ e-mail.

The n-by-m feature matrix is provided to feature reducer 340, reduces the n-by-m feature matrix to a sparse N-by-m reduced feature matrix (where N is less than n), using, for example, mutual information (450 and 460). In other words, feature reducer 340 selects a reduced set of the n features (the "reduced feature set") and reduces the size of the feature matrix accordingly. Techniques other than mutual information may be used, alternatively or additionally, to implement such feature selection. For example, document frequency thresholding, information gain, term strength, or $\chi^2$ may be used. In addition, some implementations may forego feature selection/reduction and use the n element feature set, i.e., use all of the features from the set of m unique training e-mails.

The N selected features are communicated to feature analyzer 330 (460), which analyzes the incoming e-mails during the initial threshold setting phase and the classification phase for the N selected features instead of all of the features in the incoming e-mails.

The N-by-m reduced feature matrix is input into classifier 350. Each row of the N-by-m reduced feature matrix corresponds to one of the unique training e-mails and contains data indicating which of the N selected features are present in the corresponding training e-mail. Each row of the reduced feature matrix is applied to classifier 350. As each row is applied to classifier 350, the known classification of the training e-mail to which the row corresponds also is input.

In response to the N-by-m reduced feature matrix and corresponding classifications, probabilistic classifier 350 builds an internal classification model that is used to evaluate future e-mails with unknown classification (i.e., non-training e-mails) (470). Classifier 350 may be implemented using known probabilistic or other classification techniques.

For example, classifier 350 may be a support vector machine (SVM), a Naïve Bayesian classifier, or a limited dependence Bayesian classifier. Classifier 350 also may be implemented using well-known techniques that account for misclassification costs when constructing the internal model. For example, A. Kolcz and J. Alspector, *SVM-based Filtering of E-mail Spam with Content-specific Misclassification Costs*, ICDM-2001 Workshop on Text Mining (TextDM-2001), November 2001 provides a discussion of some techniques for training a probabilistic classifier in a manner that accounts for misclassification costs.

Figure 5:
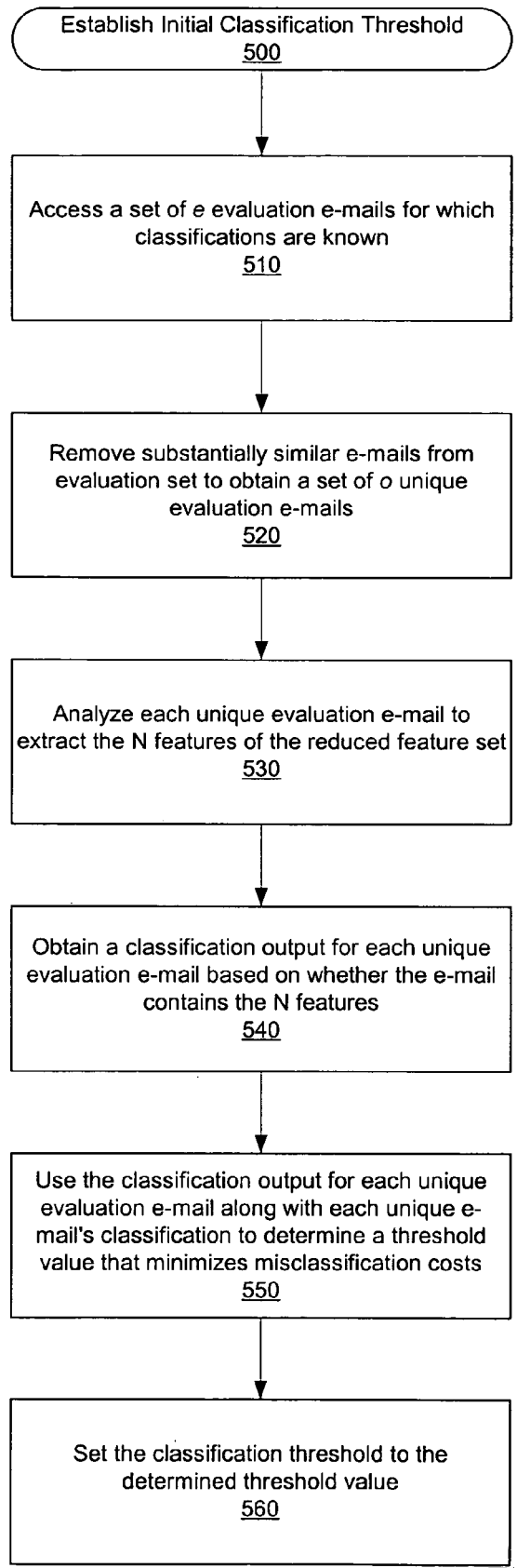
FIG. 5 is a flow chart illustrating a process by which the initial classification threshold of the probabilistic e-mail classifier of FIG. 3 is set.

Once classifier 350 is trained, the classification threshold is initially set using an optimization phase. Referring to FIG. 5, in general, during the optimization phase (500) a set of e evaluation e-mails (the "evaluation e-mails") 310b having a known classification (i.e. are known to either be spam or legitimate) is accessed (510) and used to set the initial classification threshold of classifier 232. To set the initial classification threshold, substantially similar e-mails are removed from the set of e evaluation e-mails to obtain a reduced set of o unique evaluation e-mails (520). Each e-mail in the o set of unique evaluation e-mails then is analyzed to determine whether or not it contains the N features of the reduced feature set (530). This data is used to obtain a probability measure for the e-mail and a classification output is produced from the probability measure (540). The classification output for each e-mail in the reduced set of evaluation e-mails is used along with the known classification of each e-mail in the set to obtain an initial threshold value that minimizes the misclassification costs (550). The classification threshold then is initially set to this value (560).

In particular, and with reference to the dotted line of FIG. 3, during the initial threshold setting phase, the set of e evaluation e-mails 310b is input into classifier 232 and applied to grouper 320 (510). Grouper 320 determines groups of substantially similar e-mails in the set of e evaluation e-mails 310b and selects an e-mail from each group to form a reduced set of o unique evaluation e-mails (520).

Each e-mail in the o set of evaluation e-mails is input to feature analyzer 330 (530). For each e-mail, feature analyzer 330 determines whether or not the e-mail has the N features of the reduced feature set (determined at 450 in FIG. 4B) and constructs an N element feature vector. Each entry in the N element feature vector is a binary value that indicates whether the $N^{th}$ feature is present in the e-mail.

The N element feature vector for each evaluation e-mail is input into classifier 350, which applies the internal model to the feature vector to obtain a probability measure that the corresponding e-mail is spam (540). A classification output is produced from this probability measure. The classification output, for example, may be the probability measure itself or a linear or non-linear scaled version of the probability measure. The classification output is input to threshold selector 360, along with the corresponding, known classification of the e-mail.

Once a classification output for each e-mail in the reduced set of evaluation e-mails has been obtained and input to threshold selector 360, along with the corresponding classification, threshold selector 360 determines the initial threshold (550). Conceptually, threshold selector constructs a Receiver Operating Characteristic (ROC) curve from the classification output and classifications and chooses an operating point on the ROC curve that minimizes misclassification costs.

The misclassification costs of a given classifier F with respect to a set of unique e-mails can be expressed in one exemplary representation as:

$$L_u = \pi \cdot FP + (1-\pi) \cdot \text{cost} \cdot FN$$

where the false-positive rate (FP) is:

$$FP = \frac{\sum_{x \in l_u}[F(x) = l]}{|s_u|}$$

and the false-negative rate (FN) is:

$$FN = \frac{\sum_{x \in s_u}[F(x) = s]}{l_u}$$

and where $\pi = s_u/E_u$, E is an evaluation set of e-mail, $E_u$ is the set of unique e-mails in set E, $s_u$ is the spam e-mail subset of $E_u$, and $l_u$ is the legitimate e-mail subset of $E_u$. [F(x)=s] is equal to one when the classifier returns spam as the class, zero otherwise. [F(x)=l] is equal to one when the classifier classifies an e-mail as legitimate, zero otherwise. The cost of misclassifying a spam e-mail as legitimate is assumed to be one, while cost represents the assigned cost of misclassifying legitimate e-mail as spam e-mail. The exact value of this parameter is chosen as a matter of design. For example, a value of 1000 may be chosen. As described further below, some implementations may use values of cost that depend on a legitimate e-mail's subcategory.

The relationship between FP and FN for a given classifier is known as the Receiver Operating Characteristic. Different choices of the classification threshold for a classifier result in different points along the classifier's ROC curve. Threshold selector 360 uses the classification outputs and known classifications to determine the threshold value that sets the operation of classifier 232 at a point on the classifier's ROC curve that minimizes $L_u$, i.e. the misclassification costs. For example, threshold selector 360 may evaluate $L_u$ for a number of different threshold values and choose the one that minimizes $L_u$.

Once threshold selector 360 determines the initial threshold value that minimizes the misclassification costs, the threshold value is input to threshold comparator 370 and used as an initial classification threshold (560). Threshold comparator 370 uses this threshold during classification to make a decision as to whether an e-mail is spam or not.

Figure 6:
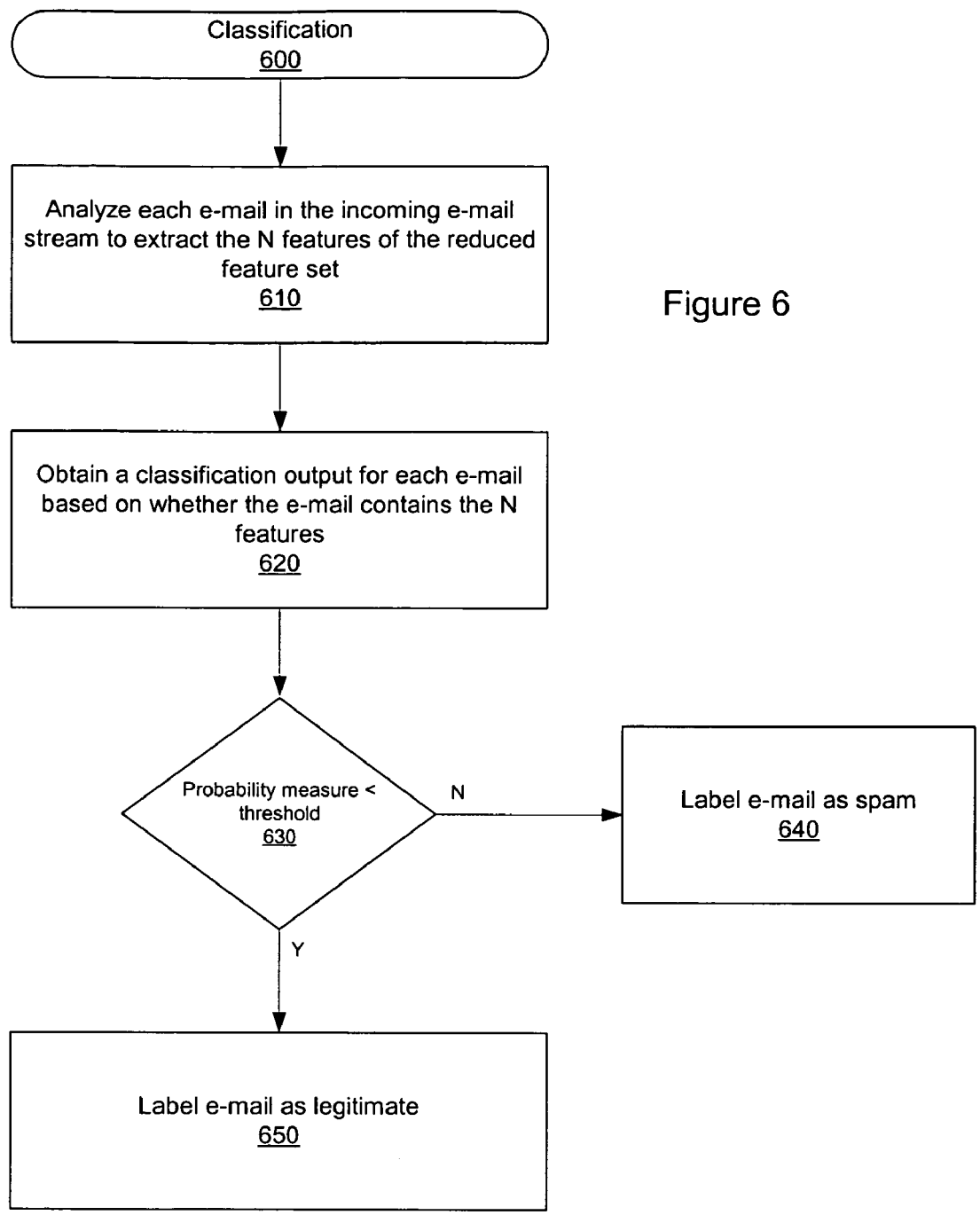
FIG. 6 is a flow chart illustrating the process by which the probabilistic e-mail classifier of FIG. 3 classifies incoming e-mail.
Figure 7:
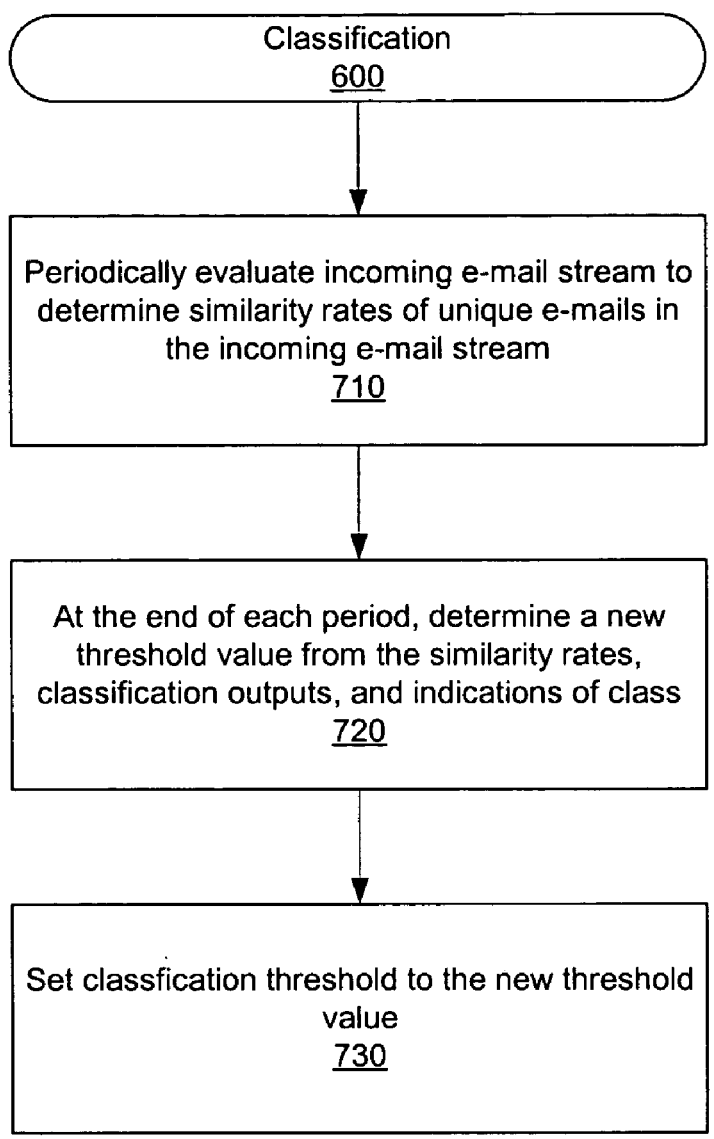
FIG. 7 is a flow chart illustrating the process by which the classification threshold of the probabilistic classifier of FIG. 3 is adjusted during operation.

Once an initial classification threshold is set, classifier 232 is placed in operation to classify incoming e-mail. Referring to FIG. 6, in general, during classification (600) each e-mail in the incoming e-mail stream is analyzed to determine whether or not it contains the N features of the reduced feature set (610). This data is used to obtain a probability measure and classification output for the e-mail (620). The e-mail is classified by comparing the classification output to the classification threshold and labeling the e-mail accordingly. The precise comparison scheme is a matter of choice. As one example, if the classification output is equal to or above the classification threshold (630), the e-mail is labeled as spam (640). If the classification output is below the classification threshold, the e-mail is labeled as legitimate (650).

The incoming e-mail stream also is evaluated to periodically determine the similarity rates of the unique e-mails in the incoming e-mail stream (710). At the end of each period, the similarity rates, the classification output of each e-mail during the period, and information about the class (e.g., obtained from user complaints) of some of the e-mails in the incoming stream, are used to determine a new threshold value that minimizes the misclassification costs, given the similarity rate of the e-mails during the period (720). The classification threshold then is set to this new threshold value (730). Thus, during operation, the classification threshold of classifier 232 is continually adjusted based on information regarding the similarity rate of e-mails in the e-mail stream.

In particular, and with reference to the long-and-short dashed reference line of FIG. 3, during the classification phase, incoming e-mails of unknown class 310c are input into classifier 232 as they arrive at the e-mail server (710). As an incoming e-mail arrives, the e-mail is input to grouper 320 to determine if it is substantially similar to an earlier e-mail. During a given period, grouper 320 tracks the number of substantially similar e-mails that occur for each unique e-mail received during the period. Alternatively, depending on the techniques used to implement grouper 320, a copy of each e-mail may be stored by grouper 320. At the end of a period, grouper 320 may use the set of stored e-mail to determine the number of substantially similar e-mails that occurred for each unique e-mail in the set (and, consequently, during the period).

After being processed by grouper 320, an incoming e-mail (whether a duplicate or not) is input to feature analyzer 330. Feature analyzer 330 determines whether or not the incoming e-mail has the N features of the reduced feature set and constructs an N element feature vector (610).

The N element feature vector is input into classifier 350, which applies the internal classification model to the feature vector to obtain a probability measure that the e-mail is spam (620) and to produce a classification output. The classification output is input to threshold selector 360 and threshold comparator 370.

Threshold comparator 370 applies the comparison scheme (630) and produces an output accordingly. The output of threshold comparator 370 is applied to mail labeler 380.

The incoming e-mail also is input to mail labeler 380. When the output of threshold comparator 370 indicates the classification output is equal to or greater than the classification threshold, mail labeler 380 labels the incoming e-mail as spam (640). When the output of threshold comparator 370 indicates the classification output is less than the classification threshold, mail labeler 380 labels the incoming e-mail as legitimate (650). The labeled e-mail then is output by mail labeler 380 and sent to mail handler 234.

Periodically during the classification phase, the classification threshold is tuned so as to minimize misclassification costs given the similarity rates in the incoming e-mails (720). As described above, grouper 320 determines the number of substantially similar e-mails that occurred for each unique incoming e-mail during a period. This information is provided to threshold comparator 370.

In addition to information on the number of substantially similar e-mails, class labels for the unique e-mails received during the period may be provided to threshold selector 360. These class labels are determined during operation, for example, from customer complaints or reports of spam e-mail to the e-mail service provider. It is highly likely that at least some customers will report high-volume spam e-mails to the e-mail service provider. Thus, a class label of spam is provided to threshold selector 360 for those unique e-mails during the period that have previously been reported as spam. The other unique e-mails are considered legitimate.

Threshold selector 360 then uses the classification outputs of all e-mail evaluated during the period, the number of substantially similar e-mails for each unique e-mail during the period, and the supplied class labels to determine a new threshold that minimizes the misclassification costs given the known number of substantially similar e-mails present in the e-mail stream.

The misclassification costs of a given classifier F with respect to a set of e-mails containing substantially similar copies can be expressed in an exemplary implementation as:

$$L = \sum_{v} v \cdot p(v) \cdot L(v)$$

where:

$$L(v) = \sum_{x} P(x|v)(P(s|x, v)[F(x) = l] + \text{cost}(x, v) \cdot P(l|x, v)[F(x) = s])$$

The parameter v represents the similarity rate. Spam is represented by s, while legitimate is represented by l. P(x|v) is the probability that the particular e-mail x occurs given the particular similarity rate v. P(s|x,v) is the probability that the e-mail x is spam given the particular similarity rate v. P(l|x,v) is the probability the particular e-mail x is legitimate given the particular similarity rate v. [F(x)=s] is equal to one when an e-mail x is classified as spam, zero otherwise. [F(x)=l] is equal to one when an e-mail x is classified as legitimate, zero otherwise. The cost of misclassifying a spam e-mail as legitimate is assumed to be one, while cost (x,v) represents the assigned cost of misclassifying legitimate e-mail as spam e-mail (e.g., 1000). As described above with respect to the optimization phase, the exact value of this parameter is chosen as a matter of design or policy.

Threshold selector 360 estimates the parameters of L(v) for the period from the number of substantially similar e-mails for each unique e-mail during the period and the supplied class labels. Threshold selector 360 uses the parameter estimates and the classification outputs of all e-mail evaluated during the period to determine the classification threshold value that minimizes L(v) (and consequently L), i.e. the misclassification costs. When evaluating L(v) to determine the minimizing threshold value, as a practical matter and to improve the statistical validity, the evaluation may be done for whole (possibly large) ranges of v rather than carrying it out for every possible value of v. The new threshold value then is provided to threshold comparator 370 for use as the classification threshold to classify incoming e-mail during the next period (730).

While described as classifying e-mail as either spam or legitimate, e-mail classifier 232 may be designed to classify e-mail into more than just those two classes. For instance, e-mail classifier may be designed and trained to classify e-mail not only as legitimate, but to further classify legitimate e-mail into one of a plurality of subcategories of legitimate e-mail. As an example, legitimate mail may have the following subcategories: personal, business related, e-commerce related, mailing list, and promotional. Personal e-mails are those that are exchanged between friends and family. Business related e-mails are generally those that are exchanged between co-workers or current and/or potential business partners. E-commerce related e-mails are those that are related to online purchases, such as registration, order, or shipment confirmations. Mailing list e-mails are those that relate to e-mail discussion groups to which users may subscribe. Promotional e-mail are the commercial e-mails that users have agreed to receive as part of some agreement, such as to view certain content on a web site.

In addition, whether or not e-mail classifier 232 is specifically designed to classify legitimate e-mail into subcategories, classifier 232 may be designed to take into account the varying misclassification costs of misclassifying e-mail in a given subcategory of legitimate e-mail as spam. For instance, misclassifying a personal e-mail as spam typically is considered more costly than misclassifying a business related message as spam. But it may be considered more costly to misclassify a business related e-mail as spam than misclassifying a promotional e-mail as spam. These varying misclassification costs may be taken into account both during training and when setting the classification threshold.

Training a classifier to develop a classification model that takes into account such varying misclassification costs generally is known and described in A. Kolcz and J. Alspector, "SVM-based Filtering of E-mail Spam with Content-specific Misclassification Costs," *ICDM*-2001 *Workshop on Text Mining* (*TextDM*-2001), November 2001.

When setting the initial threshold, such varying costs can be taken into account by setting:

$$\text{cost} = \sum_{cat} P(cat|l, x)C(s, cat)$$

where P(cat|l,x) is the probability that a particular legitimate e-mail x belongs to the subcategory cat (e.g., personal, business related, e-commerce related, mailing list, or promotional) and C(s,cat) is the cost of misclassifying a legitimate e-mail belonging to the subcategory cat as spam.

Similarly, when the threshold is adjusted during operation, such varying costs can be taken into account by setting:

$$\text{cost}(x, v) = \sum_{cat} P(cat|l, x, v)C(s, cat)$$

where P(cat|l,x,v) is the probability that a particular legitimate e-mail x belongs to the subcategory cat given the duplication rate v and C(s,cat) is the cost of misclassifying a legitimate e-mail belonging to the subcategory cat as spam.

The following is an exemplary list of subcategories cat and an exemplary cost C(s,cat) that may be used:

| Subcategory cat | Misclassification Cost C (s,cat) |
|---|---|
| Personal | 1000 |
| Business Related | 500 |
| E-commerce related | 100 |
| Mailing List Related | 50 |
| Promotional | 25 |

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. For example, instead of using thresholds (whether set initially or during operation) that fully minimize the misclassification costs (i.e., reduce the misclassification cost to the minimized cost level), a threshold could instead be chosen that reduces the misclassification costs to a predetermined level above the minimized cost level. Also, while the classification threshold has been described as being periodically adjusted during operation, in other implementations the threshold may be adjusted aperiodically. Alternatively, in other implementations, the threshold may be adjusted only a set number of times (e.g., once) during operation. Further, the threshold may be adjusted before or after the classification phase. As another example, a number of places in the foregoing description described an action as performed on each e-mail in a set or each e-mail in an e-mail stream; however, the performance of the actions on each e-mail is not required.

As yet another example, the foregoing description has described an e-mail classifier that labels mail for handling by a mail handler. However, in some implementations, it may not be necessary to label e-mail at all. For instance, the e-mail classifier may be designed to handle the e-mail appropriately based on the comparison of the classification output to the classification threshold. Alternatively the e-mail may be marked with the classification output and the mail handler may handle the e-mail differently based on the particular value of the classification output. In other implementations, it may not be necessary to label all classes of e-mail. For example, the mail handler may be designed to only act on certain classes of e-mail and just deliver non-labeled e-mail. Thus, only e-mail in certain classes would need to be labeled.

Also, while a binary feature representation is described, one of skill in the art will appreciate that other types of representations may be used. For example, a term frequency-inverse document frequency (tf-idf) representation or a term frequency (tf) representation may be used. Also, for non-text features, non-binary representations may additionally or alternatively be used. For example, if video or audio data is included, the features may include, respectively, color intensity or audio level. In this case, the color intensity or audio level features may be stored in a representation that indicates their levels, not just whether they exist or not (i.e., their analog values may be stored and used).

As another example, while classifier 350 has been described as a probabilistic classifier, in general, the classifiers 350 may be implemented using any techniques (whether probabilistic or deterministic) that develop a spam score (i.e., a score that is indicative of whether an e-mail is likely to be spam or not) or other class score for classifying or otherwise handling an e-mail. Such classifiers are generally referred to herein as scoring classifiers.

Further, while an implementation that adjusts a classification threshold value has been shown, other implementations may adjust the classification output to achieve the same affect as adjusting the classification threshold, as will be apparent to one of skill in the art. Thus, in other implementations, instead of threshold selector, a classification output tuning function may be used to adjust the algorithm for producing classification outputs from the spam or other class score (e.g., the probability measure) to obtain the same effect as a change in the classification threshold value. To do so, the classification output tuning function may evaluate a number of algorithm adjustments and choose the one that results in minimum misclassification costs. Because these two techniques obtain the same result, generally terms such as "determining a threshold value for the classification threshold that reduces misclassification costs"; "setting the classification threshold to the threshold value"; and "select and set a value for the classification threshold" should be understood as encompassing both techniques.

Accordingly, implementations other than those specifically described are within the scope of the following claims.

What is claimed is:

1. A machine readable medium storing one or more programs that implement an e-mail classifier for determining whether at least one received e-mail should be classified as spam, the one or more programs comprising instructions for causing one or more processing devices to perform the following operations:

obtain feature data for the received e-mail by determining whether the received e-mail has a predefined set of features;

train a scoring classifier using a set of unique training e-mails;

provide a classification output, using the scoring classifier, based on the obtained feature data, wherein the classification output is indicative of whether or not the received e-mail is spam;

compare the provided classification output to a classification threshold, wherein the received e-mail is classified as spam when the comparison of the classification output to the classification threshold indicates the received e-mail is spam;

determine at least one similarity rate for at least one e-mail, wherein the at least one similarity rate is the rate at which e-mails, which are substantially similar to the at least one e-mail, are received by the e-mail classifier;

select and set a value for the classification threshold, wherein selecting and setting the value for the classification threshold includes:

selecting and setting an initial value for the classification threshold that reduces misclassification costs based on a set of unique evaluation e-mails; and selecting and setting a new value for the classification threshold that reduces the misclassification costs based at least on the determined at least one similarity rate.

2. The medium of claim 1 wherein the new value for the classification threshold is selected and set also based on the classification output for the at least one e-mail.

3. The medium of claim 1 wherein the new value for the classification threshold is selected and set also based on a classification indication for the at least one e-mail.

4. The medium of claim 1 wherein the initial value of the classification threshold minimizes the misclassification costs.

5. The medium of claim 1 wherein the new value of the classification threshold minimizes the misclassification costs.

6. The medium of claim 1 wherein the misclassification costs depend on varying costs of misclassifying subcategories of non-spam e-mail as spam e-mail.

7. The medium of claim 1 wherein, to select and set the initial value for the classification threshold, the one or more programs comprise instructions for causing the one or more processing devices to perform the following operations:
   obtain known classes for unique evaluation e-mails in the set of unique evaluation e-mails;
   obtain classification outputs indicative of whether or not the unique evaluation emails in the set of unique evaluation e-mails belong to a particular class; and
   determine the initial value of the classification threshold based on the classification outputs and the known classes.

8. The medium of claim 7 wherein the initial value of the classification threshold minimizes the misclassification costs.

9. The medium of claim 8 wherein the misclassification costs depend on varying costs of misclassifying subcategories of non-spam e-mail as spam e-mail.

10. A method for determining whether at least one received e-mail should be classified as spam, the method comprising:
    obtaining feature data for the received e-mail by determining whether the received e-mail has a predefined set of features;
    training a scoring classifier using a set of unique training e-mails;
    providing a classification output, using the scoring classifier, based on the obtained feature data, wherein the classification output is indicative of whether or not the received e-mail is spam;
    comparing the provided classification output to a classification threshold, wherein the received e-mail is classified as spam when the comparison of the classification output to the classification threshold indicates the received e-mail is spam;
    determining at least one similarity rate for at least one e-mail, wherein the at least one similarity rate is the rate at which e-mails, which are substantially similar to the at least one e-mail, are received by an e-mail classifier;
    selecting and setting a value for the classification threshold, wherein selecting and setting the value for the classification threshold includes:
      selecting and setting an initial value for the classification threshold that reduces misclassification costs based on a set of unique evaluation e-mails; and
      selecting and setting a new value for the classification threshold that reduces the misclassification costs based at least on the determined at least one similarity rate.

11. The method of claim 10 wherein the new value for the classification threshold is selected and set also based on the classification output for the at least one e-mail.

12. The method of claim 10 wherein the new value for the classification threshold is selected and set also based on a classification indication for the at least one e-mail.

13. The method of claim 10 wherein the initial value of the classification threshold minimizes misclassification costs.

14. The method of claim 10 wherein the new value of the classification threshold minimizes misclassification costs.

15. The method claim 10 wherein the misclassification costs depend on varying costs of misclassifying subcategories of non-spam e-mail as spam e-mail.

16. The method of claim 10 wherein selecting and setting the initial value for the classification threshold comprises:
    obtaining known classes for unique evaluation e-mails in the set of unique evaluation e-mails;
    obtaining classification outputs indicative of whether or not the unique evaluation emails in the set of unique evaluation e-mails belong to a particular class; and
    determining the initial value of the classification threshold based on the classification outputs and the known classes.

17. The method of claim 16 wherein the initial value of the classification threshold minimizes the misclassification costs.

18. The method of claim 17 wherein the misclassification costs depend on varying costs of misclassifying subcategories of non-spam e-mail as spam e-mail.

19. An e-mail server that determines whether at least one received e-mail should be classified as spam, the e-mail server comprising:
    one or more processing devices configured to implement the following operations:
      obtain feature data for the received e-mail by determining whether the received e-mail has a predefined set of features;
      train a scoring classifier using a set of unique training e-mails;
      provide a classification output, using the scoring classifier, based on the obtained feature data, wherein the classification output is indicative of whether or not the received e-mail is spam;
      compare the provided classification output to a classification threshold, wherein the received e-mail is classified as spam when the comparison of the classification output to the classification threshold indicates the received e-mail is spam;
      determine at least one similarity rate for at least one e-mail, wherein the at least one similarity rate is the rate at which e-mails, which are substantially similar to the at least one e-mail, are received by an e-mail classifier;
      select and set a value for the classification threshold, wherein selecting and setting the value for the classification threshold includes:
        selecting and setting an initial value for the classification threshold that reduces misclassification costs based on a set of unique evaluation e-mails; and
        selecting and setting a new value for the classification threshold that reduces the misclassification costs based at least on the determined at least one similarity rate.

20. The e-mail server of claim 19 wherein the new value for the classification threshold is selected and set also based on the classification output for the at least one e-mail.

21. The e-mail server of claim 19 wherein the new value for the classification threshold is selected and set also based on a classification indication for the at least one e-mail.

22. The e-mail server of claim 19 wherein the initial value of the classification threshold minimizes misclassification costs.

23. The e-mail server of claim 19 wherein the new value of the classification threshold minimizes misclassification costs.

24. The e-mail server of claim 19 wherein the misclassification costs depend on varying costs of misclassifying subcategories of non-spam e-mail as spam e-mail.

25. The e-mail server of claim 19 wherein, to select and set the initial value for the classification threshold, the one or more programs include instructions for causing the one or more processing devices to perform the following operations:
   obtain known classes for unique evaluation e-mails in the set of unique evaluation e-mails;
   obtain classification outputs indicative of whether or not the unique evaluation e-mails in the set of unique evaluation e-mails belong to a particular class; and
   determine the initial value of the classification threshold based on the classification outputs and the known class.

26. The e-mail server of claim 25 wherein the initial value of the classification threshold minimizes the misclassification costs.

27. The e-mail server of claim 26 wherein the misclassification costs depend on varying costs of misclassifying subcategories of non-spam e-mail as spam e-mail.

* * * * *